United States Patent [19]

Clemens et al.

[11] Patent Number: 5,253,966

[45] Date of Patent: Oct. 19, 1993

[54] FASTENER FOR A MOLDED WORKPIECE

[75] Inventors: William J. Clemens, Plymouth; Dale M. Mayol, Belleville, both of Mich.; John J. Anderton, Jr., Oil City, Pa.

[73] Assignee: Ford Motor Company, Dearborn, Mich.

[21] Appl. No.: 886,268

[22] Filed: May 20, 1992

[51] Int. Cl.$^5$ ............ F16B 23/00; F16B 35/06; B41B 11/58

[52] U.S. Cl. ............ 411/399; 411/411; 411/107; 411/180; 249/165

[58] Field of Search ........... 411/82, 258, 171, 178, 411/180, 107, 399, 930, 411, 424; 249/160, 163, 165

[56] References Cited

U.S. PATENT DOCUMENTS

| | | | |
|---|---|---|---|
| 1,259,224 | 3/1918 | Guibert . | |
| 1,936,769 | 11/1933 | Olivet | 411/399 |
| 1,982,098 | 11/1934 | Hartmann | 411/171 X |
| 2,949,142 | 8/1960 | Sumerak | 411/180 |
| 3,270,793 | 9/1966 | Polmon | 411/180 |
| 4,018,049 | 4/1977 | Konishi et al. | 60/282 |
| 4,182,122 | 1/1980 | Stratton et al. | 60/322 |
| 4,284,122 | 8/1981 | Oxenreider et al. | 164/98 |
| 4,424,854 | 1/1984 | Tiegel | 164/98 |
| 4,752,171 | 6/1988 | Pliml, Jr. | 411/82 X |
| 4,776,313 | 10/1988 | Freismuth et al. | 123/470 |
| 4,799,842 | 1/1989 | Kreider et al. | 411/171 |
| 4,822,223 | 4/1989 | Williams | 411/82 |
| 4,941,785 | 7/1990 | Witten | 411/82 |

FOREIGN PATENT DOCUMENTS 4058628 5/1979 Japan .

Primary Examiner—Neill R. Wilson
Attorney, Agent, or Firm—Roger L. May; Daniel M. Stock

[57] ABSTRACT

A fastener is provided which is adapted to be at least partially embedded within a molded workpiece. The fastener comprises a first threaded section and a second section. The second section has a first end part defining a shoulder for making contact with a first portion of a mold during formation of the workpiece and a second end part having an outer end face for making contact with a second portion of the mold during formation of the workpiece. The second section further includes a crush-boss extending outwardly from the outer end face for contacting the second portion of the mold and thereby ensuring that the second section of the fastener is compressively engaged by the first and second portions of the mold during formation of the workpiece.

7 Claims, 3 Drawing Sheets

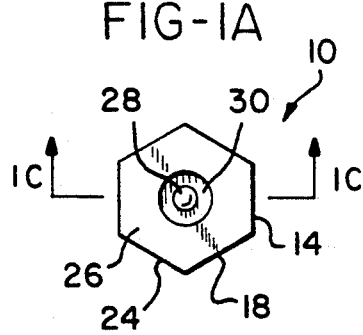
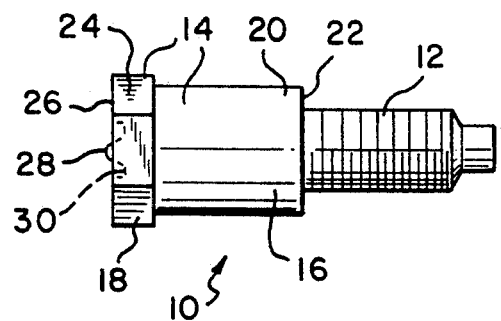
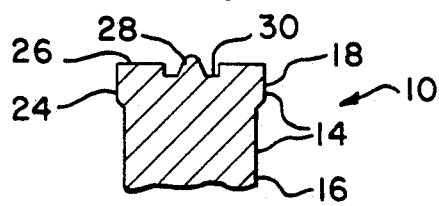
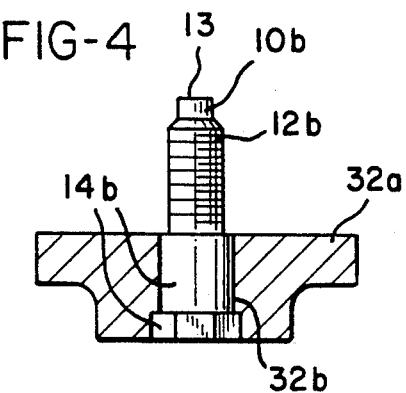
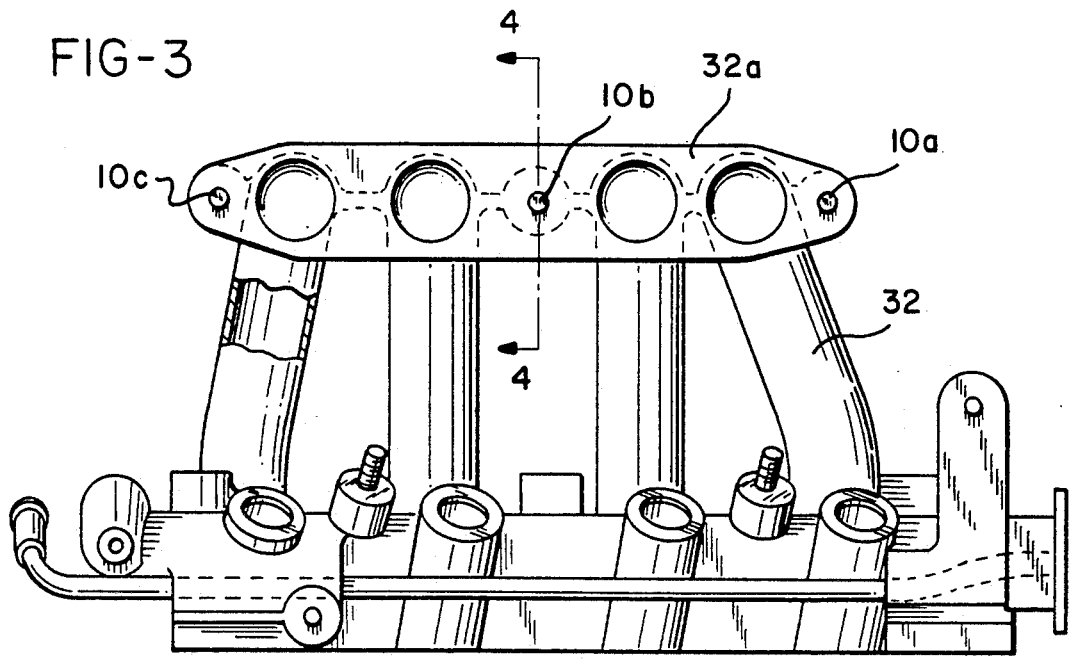

FASTENER FOR A MOLDED WORKPIECE

BACKGROUND OF THE INVENTION

The present invention generally relates to a fastener for connecting together two workpieces and, more particularly, to a fastener adapted to be at least partially embedded within a first molded workpiece to allow for easy alignment and securement of a second workpiece to the first workpiece. The present invention is particularly applicable for connecting together upper and lower intake manifold sections of an induction system for an internal combustion engine and accordingly will be described with reference to this application.

It is known in the prior art to secure together two molded workpieces, such as upper and lower intake manifold sections of an induction system for an internal combustion engine, by positioning the workpieces relative to one another so that corresponding openings in the workpieces are in alignment, passing bolts or like fasteners through the openings in the workpieces, and securing nuts to the bolts. Fasteners such as bolts and nuts normally function in an acceptable manner for securing together such workpieces. However, the process of positioning and aligning the workpieces, passing bolts through the openings in the workpieces, and securing nuts to the bolts can oftentimes be a time consuming and tedious operation, especially when the workpieces are large and awkward.

Accordingly, there is a need for an improved fastener and method for employing the same which allows for easier alignment of two workpieces relative to one another and subsequent fastening together of the same.

SUMMARY OF THE INVENTION

This need is met by the fastener of the present invention which is adapted to be at least partially embedded within a first molded workpiece during formation of the first workpiece and which allows for easy alignment and securement of a second workpiece to the first workpiece. The fastener includes a first threaded section, and a second section. The second section includes an intermediate substantially cylindrical portion and an outer portion. The outer portion defines an end part having a hexagonal shape for preventing rotation of the fastener within the first molded workpiece. The second section further includes a crush-boss which extends outwardly from the end part of the fastener. During formation of the first workpiece within a mold, the crush-boss ensures that first and second portions of the mold compressively engage the second section of the fastener for properly positioning the fastener within the mold and sealing the first threaded section to prevent molding material from reaching the threads. The first molded workpiece may comprise an intake manifold section of an induction system for an internal combustion engine or a like workpiece.

In accordance with a first aspect of the present invention, a fastener is provided which is adapted to be at least partially embedded within a molded workpiece. The fastener comprises a first threaded section and a second section. The second section has a first end part defining a shoulder for making contact with a first portion of a mold during formation of the workpiece and a second end part having an outer end face for making contact with a second portion of the mold during formation of the workpiece. The second section further includes contact means extending outwardly from the outer end face for contacting the second portion of the mold and thereby ensuring that the second section of the fastener is compressively engaged by the first and second portions of the mold during formation of the workpiece. The fastener is preferably formed from steel.

The second section of the fastener comprises an intermediate portion and an outer portion. The intermediate portion includes the first end part of the second section and the outer portion includes the second end part of the second section. The intermediate portion preferably has a cylindrical shape along substantially its entire extent while the second end part has a hexagonal shape for preventing rotation of the fastener within the workpiece.

In accordance with a first embodiment of the present invention, the first threaded section defines a threaded stud which extends beyond the second section for threadedly receiving a nut thereon and is adapted to extend out from the workpiece when the fastener is embedded within the workpiece. In accordance with a second embodiment of the present invention, the first threaded section defines an internal threaded bore extending into the intermediate portion of the second section of the fastener for threadedly receiving a bolt or like fastener therein.

The contact means preferably comprises a crush-boss formed from material that extends outwardly from the end face of the second end part. A relief area is provided on the outer end face of the second end part and is formed about the crush-boss to permit the material forming the crush-boss to be displaced as the first and second portions of the mold engage with the second section.

In accordance with a second aspect of the present invention, a method is provided for forming a molded workpiece having a fastener embedded therein. The method comprises the steps of: providing a fastener having a first section with a first diameter and a second section including first and second end parts, the first end part having a second diameter which is greater than the first diameter of the first section of the fastener; providing a mold having first and second portions which define a cavity therebetween when the first and second portions are closed, the first portion of the mold having a bore with a diameter which is less than the second diameter and which is adapted to receive the first section of the fastener; inserting the first section of the fastener into the bore in the first portion of the mold; closing the first and second mold portions to define the cavity and to compressively engage the second section between the first and second mold portions; injecting molding material into the cavity; opening the first and second portions of the mold after the molding material has substantially solidified; and, removing the workpiece from the mold.

Preferably, the method further includes the steps of: providing a substantially planar outer end face on the second end part of the fastener for making contact with the second portion of the mold when the first and second portions of the mold are closed; providing contact means on the second section of the fastener for extending outwardly from the outer end face; and, engaging the contact means with the second portion of the mold to ensure that the second section of the fastener is compressively engaged by the first and second portions of the mold when the mold is substantially closed.

BRIEF DESCRIPTION OF THE DRAWINGS

FIG. 1A is a top, plan view of the outer end face of the second distal end part of a first embodiment of the fastener of the present invention;

FIG. 1B is a side elevational view of the fastener of FIG. 1A;

FIG. 1C is a cross-sectional view of the fastener in FIG. 1A taken along section line 1C—1C;

FIG. 3 is top, plan view of the lower manifold section shown in FIG. 2;

FIG. 4 is a cross-sectional view taken along section line 4—4 in FIG. 3;

DETAILED DESCRIPTION OF THE INVENTION

Figure 2:
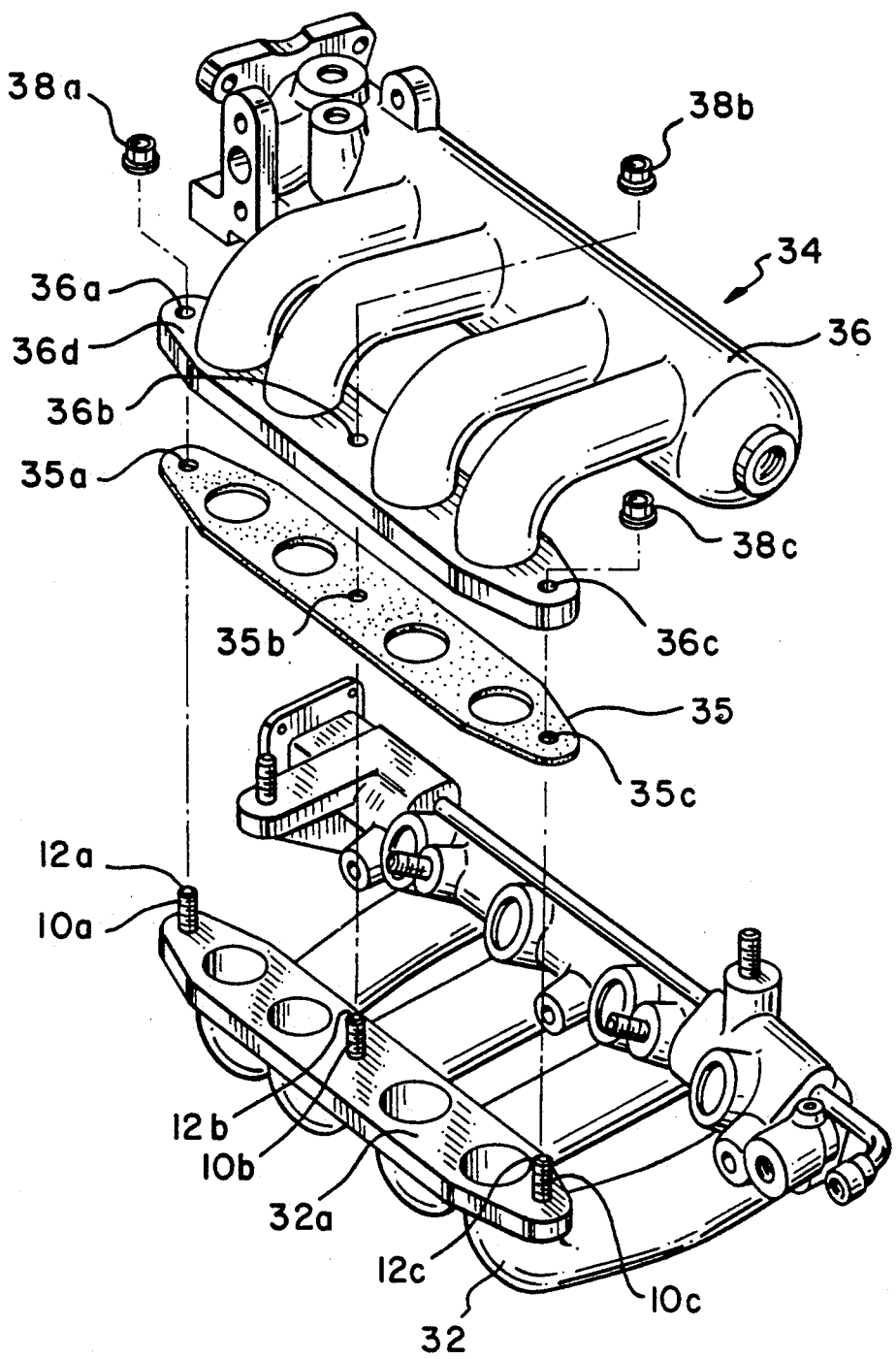
FIG. 2 is an exploded, perspective view of an induction system for an internal combustion engine including upper and lower manifold sections with the lower section having fasteners of the present invention partially embedded therein.

A first embodiment of the fastener of the present invention, generally designated by the reference numeral 10, is shown in FIGS. 1A-1C. The fastener 10 includes a first threaded section 12 and a second section 14 extending beyond the first threaded section 12. The second section 14 includes an intermediate portion 16 and an outer portion 18. The intermediate portion 16 has a cylindrical or like shape along substantially its entire extent and includes a first end part 20 which defines an annular shoulder 22 surrounding the first threaded section 12. The outer portion 18 defines a second distal end part 24 having an outer end face 26. The distal end part 24 has a generally hexagonal shape in the illustrated embodiment. Alternatively, the distal end part 24 may be formed having any other polygonal shape sufficient to prevent rotation of the fastener when embedded within a workpiece. A crush-boss 28 (also referred to herein as contact means) is provided on the second section 14 of the fastener 10 and is formed from material that extends outwardly from the end face 26 of the second distal end part 24 of the second section 14. A relief area 30 is provided in the distal end part 24 about the crush-boss 28 to allow the material forming the crush-boss 28 to be displaced when engaged during formation of a workpiece in which the fastener 10 of the present invention is intended to be embedded.

The fastener 10 of the present invention is adapted to be partially embedded within a molded workpiece. Because the fastener 10 is particularly applicable for connecting together upper and lower molded intake manifold sections of an induction system for an internal combustion engine, the fastener will now be further described with reference to this application.

In FIGS. 2 and 3, a lower intake manifold section 32 of an induction system 34 for an internal combustion engine is illustrated. The lower manifold section 32 includes a flange 32a having fasteners 10a-10c partially embedded therein. The fasteners 10a-10c along with nuts 38a-38c serve to secure the lower section 32 to an upper intake manifold section 36, which also forms part of the induction system 34. The induction system 34 is similar to the one disclosed in U.S. Pat. No. 4,776,313, the disclosure of which is herein incorporated by reference.

As best shown in FIG. 4, the second section 14b of fastener 10b is embedded within the flange 32a of the lower manifold section 32, while the first threaded section 12b of the fastener 10b extends outwardly from the flange 32a. Likewise, the second sections of fasteners 10a and 10c are embedded within the flange 32a of the lower manifold section 32, while the first threaded sections 12a and 12c of those fasteners extend outwardly from the flange 32a.

Figure 5:
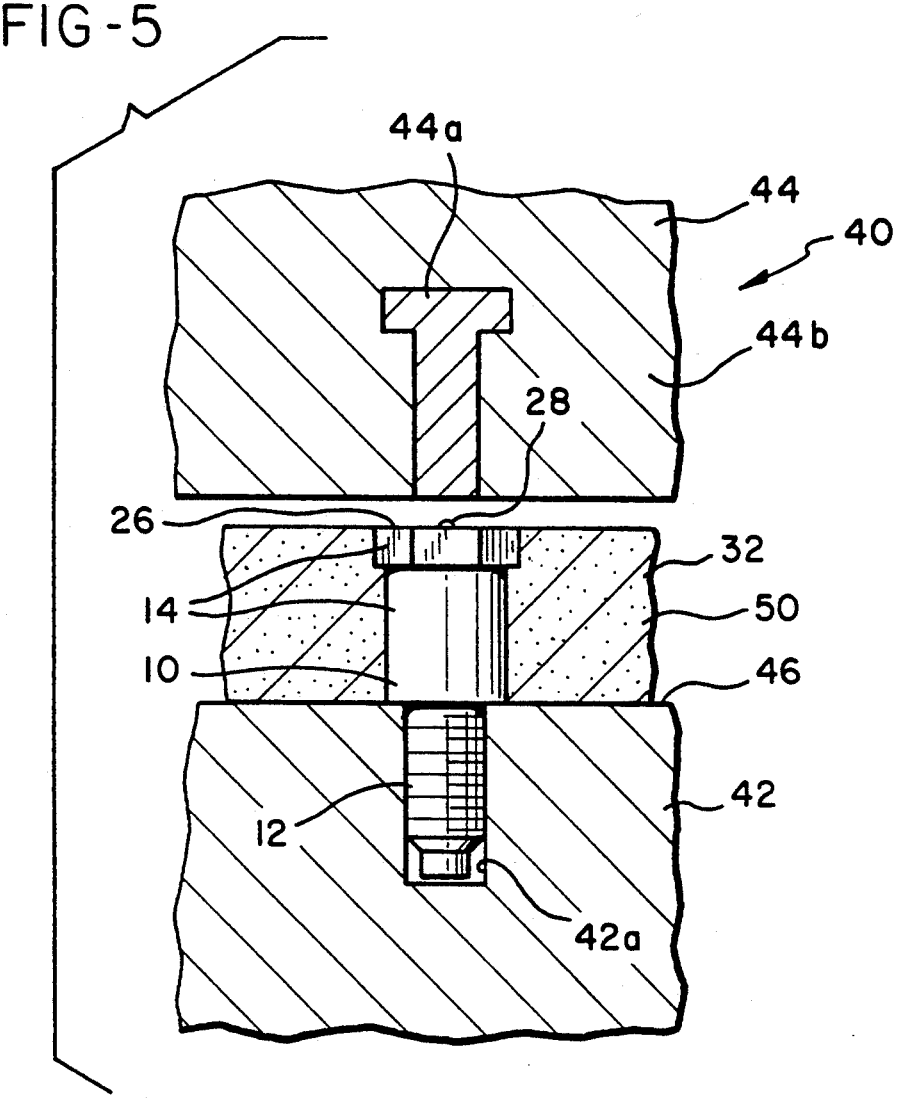
FIG. 5 is a partial sectional view showing first and second portions of a mold employed for forming a workpiece having, a fastener according to the present invention partially embedded therein; and, FIG. 6 is a side elevation view of a second embodiment of a fastener of the present invention.

A mold 40 for forming the lower manifold section 32 is shown in partial cross-section in FIG. 5. The fastener 10 illustrated in FIG. 5 may comprise any one of the fasteners 10a-10c shown in FIGS. 2 and 3. The mold 40 includes first and second portions 42 and 44, respectively. The first portion 42 of the mold 40 includes a bore 42a which is adapted to receive the first threaded section 12 of the fastener 10. As should be apparent, when forming the lower manifold section 32, three such bores 42a are provided in the first portion 42 of the mold 40, one for each of the fasteners 10-10c to be partially embedded within the lower manifold section 32. The second portion 44 of the mold 40 includes a hardened steel section 44a which serves to contact the crush-boss 28 on the fastener 10 as the first and second portions 42 and 44 of the mold 40 close together. The "hardness" of steel section 44a is greater than that of the remaining portion 44b of the second portion 44.

Because the crush-boss 28 extends outwardly from the outer end face 26 of the fastener 10, the crush-boss 28 serves to ensure that the second section 14 of the fastener 10 is compressively engaged by the first and second portions 42 and 44 of the mold 40 under substantially all fastener tolerance conditions. That is, when the length of the fastener 10 is within its design tolerances, the first and second portions 42 and 44 of the mold 40 will engage the second section 14 of the fastener 10 when they are closed. This results in the fastener 10 being properly positioned within the mold 40 and, hence, within the lower manifold section 32. It further results in the bore 42a being sealed by the annular shoulder 22 of the second section 14 of the fastener 10 for preventing molding material from reaching and being molded onto the threads of the first section 12 of the fastener 10.

The material forming the crush-boss 28 is displaced into the relief area 30 provided on the distal end part 24 of the fastener 10 as the first and second portions 42 and 44 of the mold 40 come together. Consequently, the crush-boss 28 is substantially flush with the outer end face 26 of the second distal end part 24 of the fastener 10 after the first and second portions 42 and 44 are closed.

The first and second portions 42 and 44 of the mold 40 define an inner cavity 46 therebetween in which molding material 50 is injected for forming the lower manifold section 32. The molding material 50 employed to form the lower manifold section 32 is a plastic material, such as a thermo-set phenolic plastic. After solidification of the injected molding material 50 within the cavity 46, the first and second portions 42 and 44 of the mold 40 are opened and the lower manifold section 32 is removed from the mold 40 for subsequent assembly with the upper manifold section 36 and a gasket 35 interposed between the lower and upper sections 32 and 36.

During assembly of the upper and lower manifold sections 32 and 36 and the gasket 35, the first threaded sections 12a-12c of the fasteners 10a-10c are aligned with corresponding openings 35a-35c found in the gasket 35 and corresponding openings 36a-36c found in the flange 36d of the upper manifold section 36. The first threaded sections 12a-12c are then passed through the openings 35a-35c in the gasket 35 and the openings 36a-36c in the flange 36d, and nuts 38a-38c are secured onto the first threaded sections 12a-12c for securing the upper and lower manifold sections 32 and 36 and the gasket 35 to one another.

As should be apparent from FIG. 4, if the fastener 10b fails in service, it can be easily removed from its corresponding opening 32b by applying a sufficient force to the end portion 13 of the first threaded section 12b to force the fastener 10b out from the flange 32a. Thereafter, a standard bolt (not shown) can be inserted within the opening 32b in the flange 32a and be used in combination with a washer (not shown) as a replacement for the fastener 10b.

Figure 6:
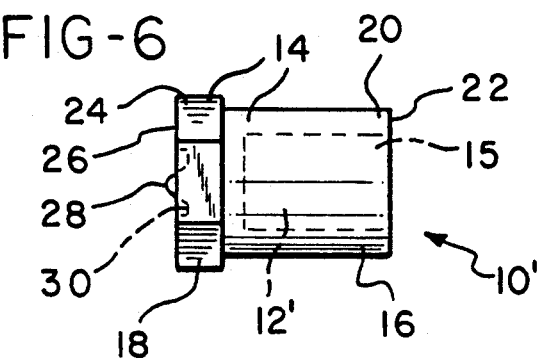

An alternative embodiment of the fastener of the present invention is shown in FIG. 6, wherein like reference numerals indicate like elements. The fastener 10' includes a first threaded section 12' defined by an internal threaded bore 15 extending into the intermediate portion 16 of the second section 14. The internal threaded bore 15 is adapted to receive a threaded bolt or like fastener (not shown) therein. The fastener 10' further includes a crush-boss 28 and a relief area 30 positioned about the crush-boss 28. In this embodiment, the crush-boss 28 functions the same as in the previously described embodiment to prevent molding material from reaching the threaded bore 15 when a workpiece, in which the fastener 10' is embedded, is molded.

With the foregoing, a fastener is provided which is adapted to be at least partially embedded within a first molded workpiece during formation of the first workpiece to permit easy securement of a second workpiece to the first workpiece. A crush-boss is provided on an end face of the fastener to permit a section of the fastener to be compressively engaged during formation of the first molded workpiece so as to ensure proper positioning of the fastener within the mold.

Having described the invention in detail and by reference to preferred embodiments thereof, it will be apparent that modifications and variations are possible without departing from the scope of the invention define in the appended claims.

What is claimed is:

1. A fastener adapted to be at least partially embedded within a molded workpiece, said fastener comprising:
   a first threaded section; and
   a second section having a first end part defining a shoulder for making contact with a first portion of a mold during formation of said workpiece and a second end part having an outer end face for making contact with a second portion of said mold during formation of said workpiece, said second section further including contact means extending outwardly from said outer end face for contacting said second portion of said mold and thereby ensuring that said second section of said fastener is compressively engaged by said first and second portions of said mold during formation of said workpiece, said outer end face of said second end part of said second section including a relief area formed about said contact means.

2. A fastener as set forth in claim 1, wherein said first threaded section defines a threaded stud which extends beyond said second section for threadedly receiving a nut thereon and is adapted to extend out from said workpiece when said fastener is embedded within said workpiece.

3. A fastener as set forth in claim 1, wherein said second section comprises an intermediate portion and an outer portion, said intermediate portion including said first end part and said outer portion including said second end part.

4. A fastener adapted to be at least partially embedded within a molded workpiece, said fastener comprising a section including a first end part defining a shoulder for making contact with a first portion of a mold during formation of said workpiece and a second end part having an outer end face for making contact with a second portion of said mold during formation of said workpiece, said section further including contact means extending outwardly from said outer end face for contacting said second portion of said mold and thereby ensuring that said section of said fastener is compressively engaged by said first and second portions of said mold during formation of said workpiece, said outer end face of said second end part of said section including a relief area formed about said contact means, and an internal threaded bore extending into said section of said fastener.

5. A fastener as set forth in claim 1, wherein said second end part of said second section has a hexagonal shape for preventing rotation of said fastener within said workpiece.

6. A fastener as set forth in claim 1, wherein said contact means comprises a crush-boss formed from material that extends outwardly from said end face of said second end part of said second section.

7. A fastener adapted to be at least partially embedded within a molded workpiece, said fastener comprising:
   a first threaded section; and
   a second section having a first end part defining a shoulder for making contact with a first portion of a mold during formation of said workpiece and a second end part having an outer end face for making contact with a second portion of said mold during formation of said workpiece, said second section further including contact means comprising a crush-boss extending outwardly from said outer end face for contacting said second portion of said mold and thereby ensuring that said second section of said fastener is compressively engaged by said first and second portions of said mold during formation of said workpiece, said outer end face of said second end part of said second section including a relief area formed about said crush-boss to permit said material forming said crush-boss to be displaced as said first and second portions of said mold engage with said second section.

* * * * *